(12) United States Patent
Muth et al.

(10) Patent No.: US 6,484,754 B1
(45) Date of Patent: Nov. 26, 2002

(54) PIVOTING VALVE DEVICE, ESPECIALLY AN AMPLIFIER

(75) Inventors: Andreas Muth, Kirchheim (DE); Peter Waiblinger, Esslingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/856,392

(22) PCT Filed: Nov. 10, 1999

(86) PCT No.: PCT/EP99/08613

§ 371 (c)(1),
(2), (4) Date: May 22, 2001

(87) PCT Pub. No.: WO00/31447

PCT Pub. Date: Jun. 2, 2000

(30) Foreign Application Priority Data

Nov. 26, 1998 (DE) .......................... 198 54 620

(51) Int. Cl.⁷ ...................... F15B 13/042; F16K 11/052
(52) U.S. Cl. ............... 137/625.66; 137/625.44
(58) Field of Search ........................ 137/625.44, 625.66

(56) References Cited

U.S. PATENT DOCUMENTS

| 1,166,027 A | 12/1915 | Weisgerber et al. | |
|---|---|---|---|
| 3,446,244 A | 5/1969 | Beck | |
| 3,464,448 A | * 9/1969 | Schmitz | 137/625.44 |
| 6,186,175 B1 | * 2/2001 | Frisch et al. | 137/625.44 |

FOREIGN PATENT DOCUMENTS

| DE | 73 24 333 | 9/1973 |
| DE | 35 03 357 A1 | 8/1986 |
| DE | 37 34 079 C2 | 4/1988 |
| EP | 0 933 569 A2 | 8/1999 |
| GB | 1 453 796 | 10/1976 |
| GB | 2 089 941 A | 6/1982 |

* cited by examiner

Primary Examiner—Gerald A. Michalsky
(74) Attorney, Agent, or Firm—Hoffmann & Baron, LLP

(57) ABSTRACT

A valve means (1) containing a switching element in the form of a switching rocker member (13). The rocking arms (18 and 18') placed on either side of the pivotal portion (15) of the switching rocker member (13) are respectively engaged by a respective actuating diaphragm (35 and 35') and adjacent thereto there is a closure portion (27 and 27') associated with a duct opening (24 and 25). A valve means designed in this manner renders possible a particularly flat, planar structure with compact dimensions and a small dead volume.

15 Claims, 4 Drawing Sheets

PIVOTING VALVE DEVICE, ESPECIALLY AN AMPLIFIER

FIELD OF THE INVENTION

The invention relates to a valve means and more particularly an amplifier comprising a housing, which contains a movable switching element having two closure portions each associated with the opening of a fluid duct and engaged at two spaced points by two actuating diaphragms, which are able to be subject to fluid so that the switching element is able to be positioned in at least two switching positions in which the respectively one duct opening is closed and the respectively other duct opening is open.

BACKGROUND OF THE INVENTION

Valve means of this type are customarily employed as pneumatic amplifiers, which are in a position to influence fluid flows with a high pressure and a high rate of flow using low control pressures. As far as the assignee is aware pneumatic amplifiers so far devised are characterized by having a plunger-like switching element having two closure portions adapted to close and open the opening of a respectively associated fluid duct in a manner dependent on the switching position of the switching element. The respective switching position is set by actuating diaphragms for engaging the switching element at two axially spaced points, and which as needed are subjected to a fluid acted upon by a control pressure. The switching over of valve means, which may be termed a diaphragm amplifier, takes place as part of a linear movement of the switching element.

It is considered to be a disadvantage of the valve means of this type that a reduction of the overall size and a standardization of the geometry thereof is only possible to a limited extent. The necessary arrangement of the ducts in the interior of the housing means that a certain minimum height is more or less necessary and can not be gone below. If various different amplifier functions are to be realized, then as a rule radical changes are necessary in the structure.

OBJECTS AND SUMMARY OF THE INVENTION

One object of the present invention is to create a valve means which has more compact dimensions and whose design is more readily adaptable.

In order to achieve this aim the switching element is constituted by a switching rocking member adapted to perform a pivotal movement on switching over, whose rocking arms placed on either side of the pivotal portion are engaged respectively by one of the actuating diaphragms and on which respectively one of the closure portions is provided.

It is in this manner that a valve means is provided, which may be manufactured with an extremely low, flat form, because on the one hand the actuating diaphragm and on the other hand the closure portions may be arranged, switching over no longer involving a linear movement but rather involves a pivoting or rocking movement of the rocker-like switching element which may consequently be termed a switching rocker member. The valve means may be employed in a relatively universal manner and is suitable, given a the correct geometry, more particularly as well in micro-actuators as a principal valve stage or in conjunction with other actuators as a high speed drive for valves having a large rated aperture or lumen. Moreover, the design in accordance with the invention favors a realization of the valve means in manufacturing methods in connection with micro-technology , because same are specifically suitable for the manufacture of flat, laminated structures. Finally the design of the invention favors the manufacture of valve means having different functions, because it is particularly in the case of an amplifier that there is the possibility of clearly separating the control plane and the power plane.

Further advantageous developments of the invention are defined in the dependent claims.

The switching rocker member and the actuating diaphragms are preferably accommodated in a common interior space in the housing. The housing itself may comprise several housing parts placed together as layers or lamellas, the two actuating diaphragms being held between the same housing parts.

The necessary pivotal movement of the rocking member could be predetermined exclusively by way of its attachment to the diaphragms, but however in order to ensure an exact switching function the invention preferably contemplates a pivotal support of the switching rocker member at its pivot portion.

A structure would be possible in which the actuating diaphragms only touch the switching rocker member. Presently a design is considered to be more convenient in which the actuating diaphragms are attached not only on the housing but also on the inherently rigid switching rocker member.

Both the actuating diaphragms and also the duct openings associated with the closure portions are preferably at least approximately at the same level as each other.

In order to produce an amplifier function in a particularly advantageous fashion there is preferably a provision such that the first and second fluid ducts associated with the closure portions and furthermore a third fluid duct communicate which are common connecting chamber, by way of which the fluid may be transferred, dependent on the switching position of the switching rocker member between the third fluid duct and one of the two other fluid ducts. Each of the two actuating diaphragms in this case preferably constitutes a movable wall between the connecting chamber and a control chamber, the two control chambers being separated from one another and each communicating with a control duct, by way of which the action of fluid on them may be set. In the case of such a structure it is frequently possible to alter the manner of functioning simply by changing the arrangement of the connections of the ducts, and for instance different types of amplifiers may be realized, which normally set a closed position or normally set an open position.

The actuating diaphragms may be designed with the same or different areas and in different sizes, forms and cross sections, it being possible to provide for preset deflections in the force-free state in order to influence the switching position of the switching rocker member.

The closure portions may be integrated in the switching rocker member or be in the form of separately applied sealing bodies.

In the case of the two actuating diaphragms it may be a question of individual diaphragms. However simpler manufacture and assembly is possible if the actuating diaphragms are united together in a common integral diaphragm element.

In what follows the invention will be described in detail with reference to the accompanying drawings.

DETAILED DESCRIPTION OF THE PREFERRED EMBODIMENTS

Figure 1:
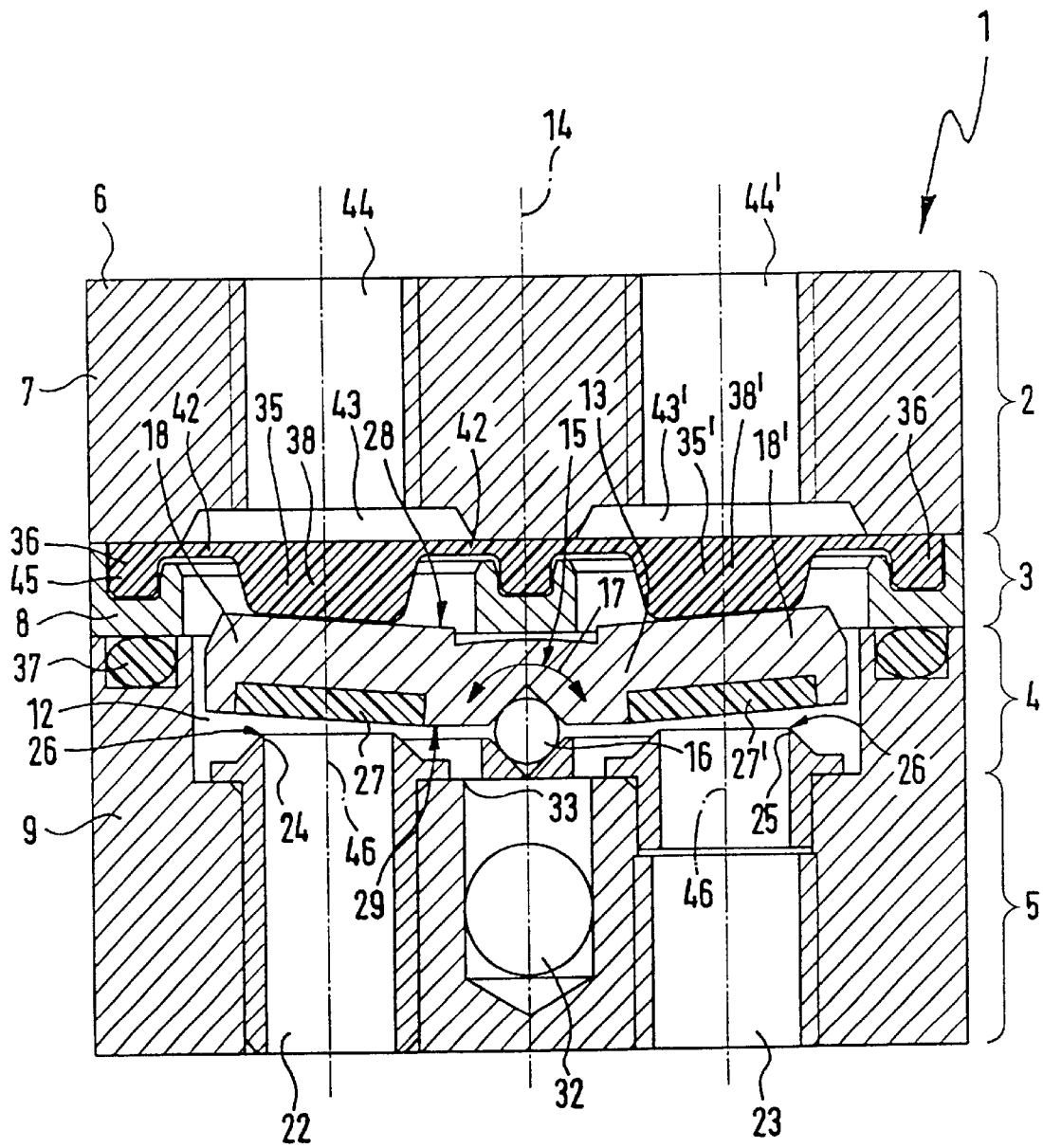
FIG. 1 shows a preferred embodiment of a valve means designed in the form of a pneumatic amplifier in a longitudinal section.

Firstly the general structure of a preferred working embodiment of the valve means in accordance with the invention will be described with reference to FIG. 1.

The valve means generally referenced 1 in the present case possesses a structure rendering possible use as a pneumatic amplifier. The valve means 1 is in this case divided up into several superposed planes functionally, that is to say in a first connection plane 2, which is in the working example is on top, a control plane 3 arranged underneath it, a power plane 4 placed thereunder and a second connection plane 5 which is at the bottom.

The valve means 1 comprises a preferably block- or plate-like housing 6, which is made up of a plurality of housing parts 7, 8 and 9 arranged as layers. The division up of the housing does not have to be the same as the illustrated division into planes.

The housing 6 contains an interior space 12, in which a moving switching element is accommodated, which owing to its rocker-like design and manner of operation is referred to as a switching rocker member 13.

Irrespectively of the alignment of the housing 6 adopted during operation the direction of the sequence of individual planes will be termed the height direction 14, which in FIG. 1 is marked by a chained line. The switching rocker member 13 is so arranged inside the interior space 12 of the housing that it extends athwart the height direction 14 thereof, it possible having and angled longitudinal form.

The switching rocker member 13 has a pivotal portion 15 at its longitudinal middle point in the working example, at which it is so supported on the housing 6 in an articulating manner by way of a pivotal bearing means 16 that in relation to the housing 6 it may perform a pivotal movement 17 indicated by a double arrow, as part of which movement the rocker arms 18 and 18', which extend in opposite directions away from the pivotal portion, are reciprocated like a see/saw. The pivotal bearing means 16 may be a fixed component of the housing 6 or it can be constituted by one or more separate parts, which are borne between the housing 6 and the pivotal portion 15 of the switching rocker member 13 and may be for instance like balls or corrugations in shape. First and second fluid ducts 22 and 23 open into the interior space 12 of the housing and their openings 24 and 25 are aligned in the vertical direction 14 and are surrounded by an annular valve seat. The valve seats 26 may be components of separate components inserted into the respective lower housing part 9. Such a design offers the advantage that the valve seats may be made like jets or nozzles in a simple manner. Furthermore insert parts may be employed if required which have different diameters in order to provide different flow cross sections or lumens if required as part of modular system.

The arrangement is such that each opening 24 and 25 is opposite to one of the two switching rocker arms 18 and 18'. In the portion opposite to the respective opening 24 and 25 each switching rocker arms 18 and 18' has a closure portion 27 and 27' of suitable sealing material and more particularly of plastic material having rubber-elastic properties.

As related to the height direction 14 the duct openings 24 and 25 are preferably at the same level of the housing 6, same being placed adjacent to each other and at a distance apart athwart the height direction 14. Since the member 13 is slightly angled so that the rocker arms 18 and 18' is so set at a small angle of under 180 degrees angle that its rocking arms 18 and 18' make an obtuse angle at the top longitudinal side 28, opposite to the closure portions 27 and 27' it is possible for the switching rocker member 13 to be pivoted between two positions of rocking, in which, respectively. the one closure portion 27 and, respectively, 27' closes the respective duct opening 24 and respectively 25, by engagement with the associated valve seat 26, while simultaneously the respectively other closure portion 27' and 27 is lifted clear of the associated duct opening 25 and, respectively, 24 and permits fluid passage through the respective duct opening. The switching movement takes place like the movement of a swing or see-saw.

In the second connection plane the lower housing part 9 has a third fluid duct 32 extending through it, which at a suitable point also opens into the interior space 12 of the housing, the connection being open at all times. The associated duct opening 33 is preferably also aligned in the height direction 14 and may be located between the two other duct openings 24 and 25. In the working embodiment it is opposite to the pivotal portion 15 in the height direction 14.

The switching rocker member 13 is located in the power plane 4 in the portion, which in the working embodiment is the bottom portion, of the interior space 12 of the housing, which space will be henceforth termed the connection chamber 34. Dependent on the particular position of switching of the switching rocker member 13 there is a fluid connection, extending through the connecting chamber 35, between the third fluid duct 32 and the first or second fluid division 22 and 23.

In the portion, adjoining the switching rocker member 13 in the height direction 14 adjacent to the top longitudinal side 28, of the interior space 12 of the housing, which represent the control plane 3, there are two actuating diaphragms 35 and 35'. In the working embodiment illustrated they consist of a polymeric plastic material and have rubber-like properties. The arrangement is such that opposite to each rocking arm 18 and 18' on the longitudinal side 28 opposite to the respective closure part 27 and 27', there is one of the actuating diaphragms 35 and 35'. Thus the two actuating diaphragms 35 and 35' engage the same longitudinal section of the switching rocker member 13, on which furthermore one of the closure parts 27 and 27' is provided, only on the opposite longitudinal side of the switching rocker member 13.

It is preferred for the two actuating diaphragms 35 and 35' to be adjacent each other as related to the height direction 14 in the control plane 3. They respectively have outer surrounding peripheral edge part 36 attached to the housing 6 in a sealing manner. In the working embodiment illustrated in FIG. 1 this is because their surrounding peripheral edge part 36 is clamped between the top housing part 7 defining the first connection plane and a middle housing part 8 defining the control plane 3 in a firm manner. The two actuating diaphragms 35 and 35' are consequently fixed between the same housing parts 7 and 8, something substantially simplifying assembly.

The surrounding peripheral edge part 36 of the actuating diaphragms 35 and 35' simultaneously constitutes the seal between the top and the middle housing parts 7 and 8. The seal between the middle and the bottom housing parts 8 and 9 is produced in the working example by an intermediately placed annular seal 37 between these housing parts in the peripheral part of the interior space 12 of the housing.

It will be clear that the division of the housing 6 may be different to that illustrated and it would be more particularly possible to provide only two housing parts, which between them define the interior space 12 of the housing and between which the actuating diaphragms 35 and 35' are clamped at the edge (comparable to the designs illustrated in FIGS. 2 through 5).

At their central portion 38 the actuating diaphragms 35 and 35' engage respectively associated rocker arms 18 and 18'. In this respect a plain engagement by touching would be possible, but however the physical attachment adopted in the working example is recommended, which means that a respective central diaphragm part 38 and 38' is at all times only movable jointly with the associated rocker arm 18 and 18' irrespectively of the direction of pivoting of the switching rocker member 13. In order to simplify assembly and any necessary dismounting it may here be a question of a releasable type of attachment.

The desired position of switching and/or switching movement of the switching rocker member 13 may be produced by ganged fluid operation of the actuating diaphragms 35 and 35'. Given a suitable operation by fluid the central diaphragm portions 38 and 38' are caused to move generally in the height direction 14, such movement being transmitted to the switching rocker member 13 with a thrusting or drawing effect. Because the central diaphragm portions 38 and 38' are held by way of elastic intermediate portions 42 in a flexible manner on the surrounding peripheral edge portions 36, during the pivoting or rocking movement of the switching rocker member 13 they readily allow for the small change in direction of the movement.

Figure 2:
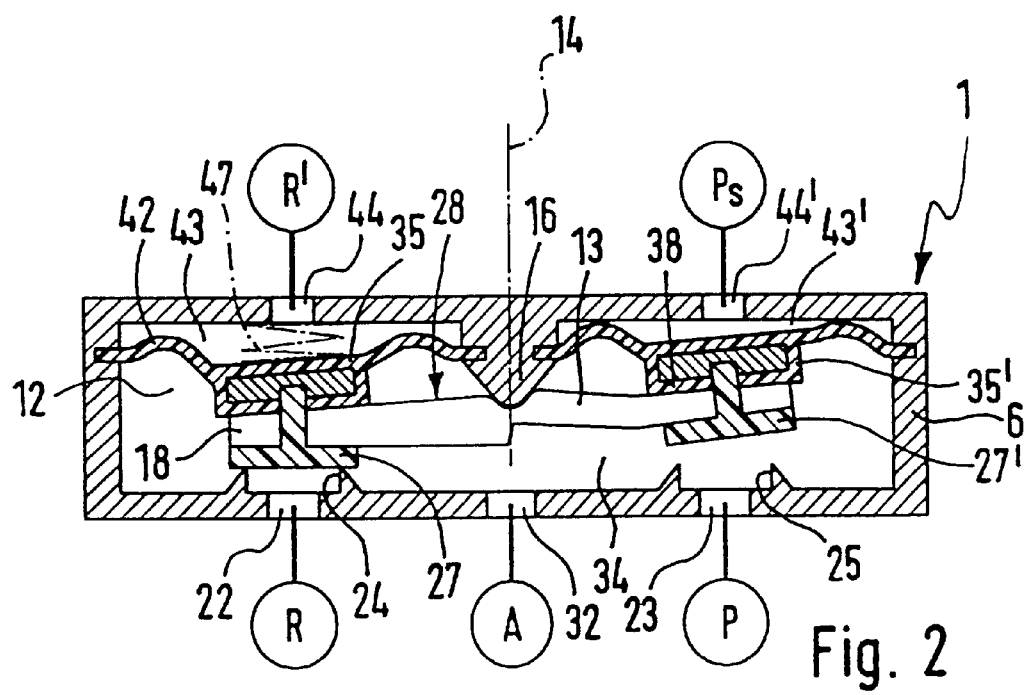
FIG. 2 shows a valve means of a comparable design to that of FIG. 1 in a highly diagrammatic longitudinal sectional view, there being one amplifier of the "normally open" type, which is illustrated in the open state.

It is possible to provide the valve means with a spring means 47 indicated in chained lines in FIG. 2 for example, which bears against the housing 6 and the switching rocker member 13 and biases the switching rocker member 13 in a regular manner into a switching position representing the home position of the valve means.

The actuating diaphragms 35 and 35' divide up the interior housing space 12 into the above mentioned connecting chamber 34 and into two control chambers 43 and 43' associated with respectively one of the actuating diaphragms 35 and 35'. Each actuating diaphragm 35 and 35' constitutes a fluid-tight, moving wall between the connecting chamber 34 and a control chamber 43 and 43' arranged on the side opposite to the switching rocker member 13. Each of the control chambers 43 and 43' communicates with its own control duct 44 and 44' extending in the first connection plane 2 and, in the working example, through the top housing part 7. The control ducts 44 and 44' open like the fluid ducts 22, 23 and 32 at their outer end at the outer face of the housing 2, where there is the possibility of connecting up fluid ducts leading to other equipment.

In what follows a first preferred manner of operation of the valve means 1 will be described with reference to FIGS. 2 and 3, the diagrammatic drawings simultaneously indicating some possibilities of modification in the design structure of the valve means.

Figure 3:
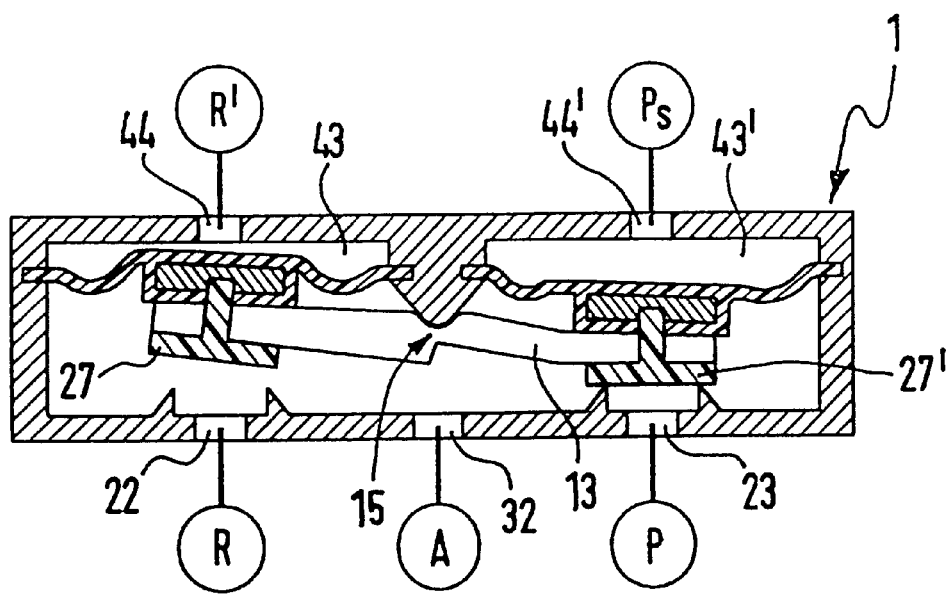
FIG. 3 shows the valve means of FIG. 2 in the closed position of the rocking member.

The fluid circuit diagram of the valve means 1 in accordance with FIGS. 2 and 3 is so selected that the first fluid duct 22 constitutes a venting duct, which is connected with a pressure sink and more particularly with the atmosphere R, whereas the second fluid duct 23 constitutes a supply duct, which is connected with a source P of pressure, which makes available a pressure medium, which is more especially gaseous and is subject to a working pressure. The third fluid duct 32 is a power duct which is able to be connected with a load A, as for instance a principal valve, which is to be controlled by the valve means 1 with a pilot function or a directly connected load. The first control duct 44, which is associated with the first actuating diaphragm 35 cooperating with that rocker arm 18 which controls the opening of the first fluid duct 22, constitutes a second venting duct, which like the first fluid duct 22, is continuously connected with a pressure sink and is more particularly connected with the atmosphere, something which is indicated by the letter R'. The second control duct 44' associated with the second control chamber 43' and the second actuating diaphragm 35'. constitutes a principal control duct, which is connected with a control pressure source $P_s$ able to supply a variable control pressure, at least two pressure values being possible in the present case, on the one hand the atmospheric pressure or pressure of the surroundings and on the other hand a pressure level corresponding to the power or working pressure. The action of the pressure is controlled by means of a valve (not illustrated) associated with the second control duct 44'.

The valve may be operated not only with a gaseous but also with hydraulic pressure medium.

FIG. 2 shows the home position of the valve means, in the case of which it is here a question of an open position, which is produced by the application of a control pressure of zero bar to the second control duct or, respectively, principal control duct 43', that is to say the second control chamber 43' is vented. The balance of forces occurring at the actuating diaphragms 35 and 35' and the switching rocker member 13 then means that the switching rocker 13 is pivoted into a switching position, in which the connection between the venting duct 22 and the connecting chamber 34 is closed, whereas simultaneously the supply duct 23 communicates with the connecting chamber 34 owing to the closure portion 27' being moved clear of its duct opening 25 so that the pressure medium at the lower pressure level may flow into the power duct 32 and consequently to a connected load A.

In order to vent the load A a higher control pressure is applied to the principal control duct 44, such pressure being equal to the power pressure in the working example. The balance of forces now existing results in a rocking or pivotal motion of the switching rocker member 13 into the second switching position representing the opened position as indicated in FIG. 3. The connection between the supply duct 23 and the connecting chamber 34 is interrupted here, whereas simultaneously the pressure medium may flow off from the load A by way of the connecting chamber 34 into the venting duct 22 constituted by the first fluid duct, because the closure portion 27 associated with latter is open.

All in all the valve means 1 is able to perform a 3⁄2 valve function in the working example.

Figure 4:
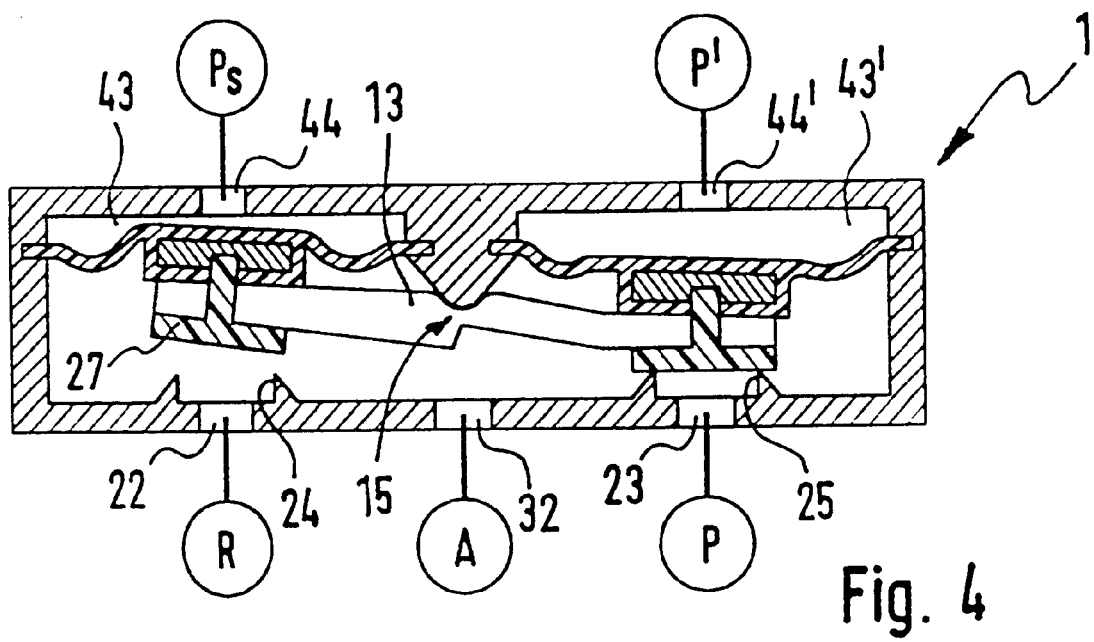
FIG. 4 shows a valve means of an identical design to that of FIG. 2, in the case of which however a different fluid connection arrangement is provided so that there is a "normally closed" type, which is illustrated in the closed setting.
Figure 5:
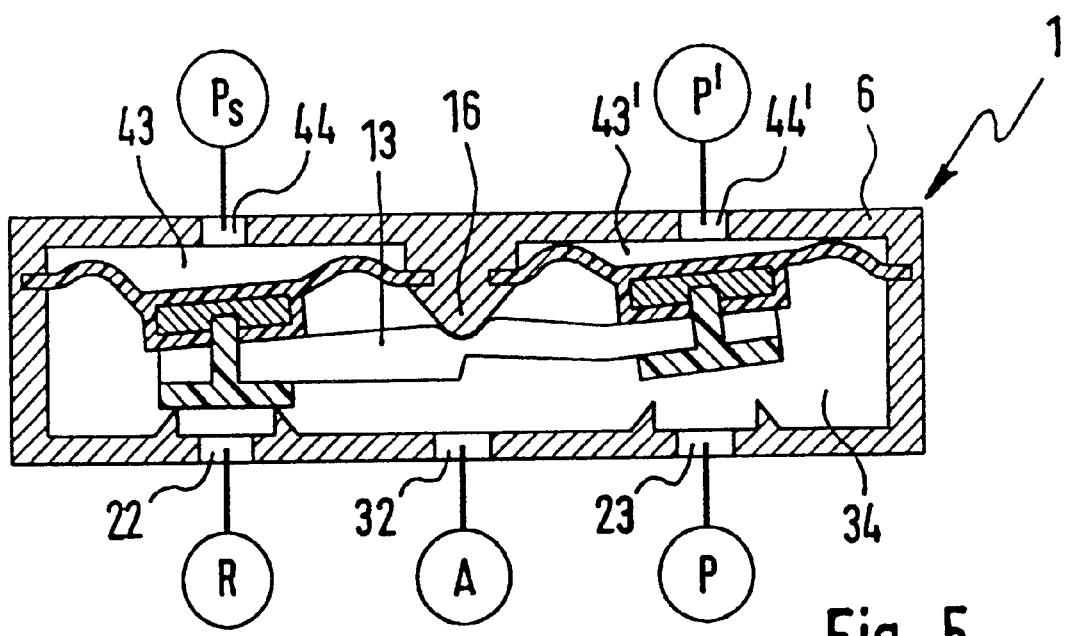
FIG. 5 shows the valve means of FIG. 4 in the open position.

While in the working embodiment of FIGS. 2 and 3 the selected fluid circuit diagram means that there is a valve means of the "normally open" type, the working example of FIGS. 4 and 5 represents a valve means of the "normally closed" type owing to its slightly modified connection arrangement.

In the case of the working embodiment of FIGS. 4 and 5 the connection of the three fluid ducts 22, 23 and 32 of the power plane corresponds to that of the working example of the FIGS. 2 and 3. The changes in the fluid connections only relate to the control plane and, respectively, the two control ducts 44 and 44'.

Thus gage pressure is continuously present at the second control duct 44' and accordingly in the associated second control chamber 43' since there is a constant connection with a first source P' of control pressure, the control pressure in the working example being equal to the power pressure present in the supply duct 23. The volume of compressed air held in the control chamber 43' consequently constitutes a pneumatic spring, which effects closure of the supply duct 23 as long as there is a control pressure of for example zero bar in the first control chamber 43 and, respectively, in the first control duct 44 connected with same. This is achieved because the first control duct 44 is connected with a second control pressure source $P_s$, by way of which a control pressure with a variable pressure level may be supplied. If such control pressure is equal to the pressure of the atmosphere, the switching rocker member 13 will assume the closed position illustrated in FIG. 4, the supply duct 23 being closed and a connection being produced between the power duct 32 and the venting duct 22. For switching over into the open position depicted in FIG. 5, the second control pressure source $P_s$ produces a gage pressure in the first control chamber 43, which gage pressure may be equal to the power pressure, something which results in a displacement of the balance of forces so that the switching rocker member 13 is pivoted in the open position, in which the three fluid ducts 22, 23 and 32 are connected together in the fashion already described with reference to FIG. 2.

It will be seen that the valve means 1 renders possible a modification of the valve and amplifier functions which are possible without having perform substantial changes in design and in fact it is essentially sufficient to change the fluid connection of some valves.

FIGS. 2 through 5 furthermore serve to indicate that it is an advantage to arrange the outer duct openings of the first, second and third fluid ducts 22, 23 and 32, provided on the outer side of the housing 6, at least approximately at the same level perpendicular to the height direction 14 adjacent to one another. In a similar manner it is more particularly possible to arrange for the outer openings of the control ducts 44 and 44', present on the outer side of the housing 6, to be also at least approximately at the same level perpendicularly to the height direction 14 adjacent to each other.

In the case of the working examples of FIGS. 2 and 5 the two actuating diaphragms 35 and 35' are in the form of mutually separate components. On the other hand in the case of the working example of FIG. 1 they are collected together integrally in a common diaphragm element 45, something which simplifies manufacture and assembly. In both cases the actuating diaphragms are preferably manufactured at least in part of a rubber-like elastic material, at least in the elastic intermediate portions 42, a polymer material being preferred.

An arrangement which is particularly readily assembled is produced if the switching rocker member 13, the actuating diaphragms 35 and 35' and the closure portions 27 and 27' are united as a common element.

While in the working embodiment of FIG. 1 the pivotal bearing means 16 is provided adjacent to bottom longitudinal side 29 of the switching rocker member 13 opposite to the actuating diaphragms 35 and 35', in the working examples of FIGS. 2 through 5 it is located adjacent to the top longitudinal side 28 of the switching rocker member 13 facing the actuating diaphragms 35 and 35'. To precisely set an exact range of pivoting it would however be possible as well to provide suitable guide means on the top side and also on the bottom side. Furthermore it would be feasible to ensure the desired switching over characteristic simply by the attachment of the switching rocker member 13 on the actuating diaphragms 35 and 35' and to do without an additional supporting engagement of the pivotal portion on the housing.

Figure 4A:
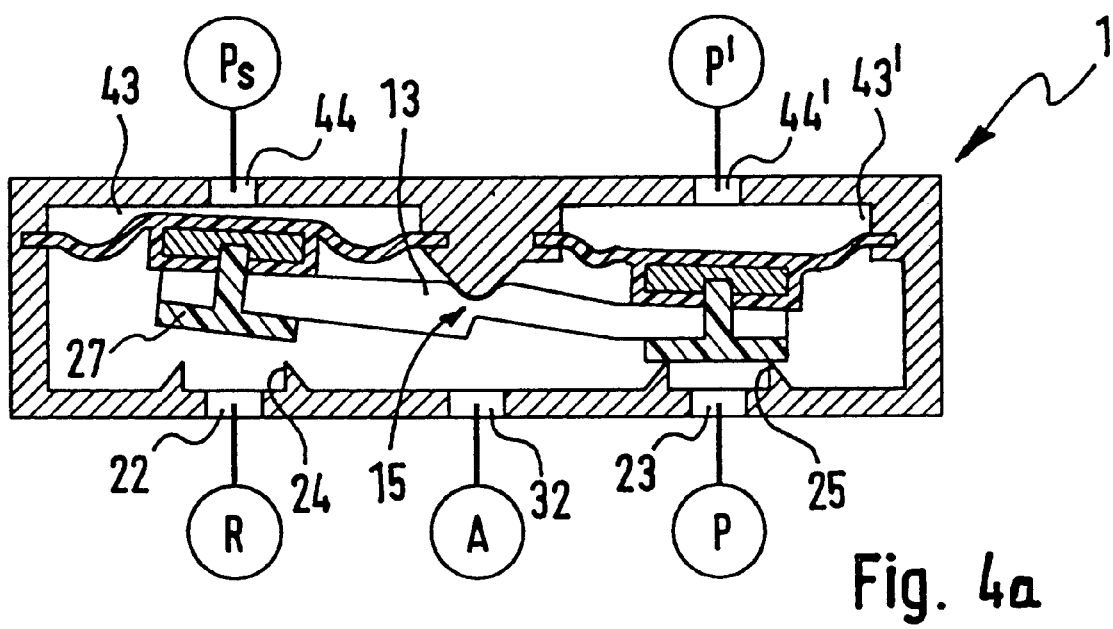
FIG. 4a shows a valve means of an identical design to that of FIG. 4, wherein the two actuating diaphragms have different areas.

Changes in the switching characteristic of the valve means may also be provided by having the diaphragms not of equal area as in the working example but with different areas, forms and/or cross sections, as shown in FIG. 4a. It is furthermore possible to so design the actuating diaphragms that in the condition free of forces they retain the deflections imparted to them.

While in the working example of FIG. 1 the closure portions 27 and 27' are set in the switching rocker member 13, so that it is possible to speak of an integral construction, the working examples of FIGS. 2 through 5 as separate sealing bodies possess closure portions 27 and 27' arranged on the corresponding longitudinal side of the switching rocker member 13.

As already noted, the housing 6 in the working embodiment of FIG. 1 is divided into three housing parts 7, 8 and 9, the clamping in place of the actuating diaphragms 35 and 35' being between the top housing part 7 having the control ducts 44 and 44' and the middle housing part 8 adjoining same. The middle housing part 8, which may be termed an intermediate plate, ensures on the one hand a reliable sealing function between the control chambers 43 and 43' and on the other hand facilitates working with different actuating diaphragms having different areas and/or being separate.

A particularly compact and flat design of the valve means 1 is more particularly ensured if the actuating diaphragms 35 and 35' and the duct openings 24 and 25 controlled by the switching rocker member 13 are respectively arranged adjacent to each other in a perpendicular direction, the perpendicular direction extending athwart and more particularly at a right angle to the mutually parallel longitudinal axes 46 and 46' of the duct openings 24 and 25, such longitudinal axes being aligned in the same direction in the working example as the height direction 14.

One advantage of the working examples is also that owing to the arrangement of the outer openings of the fluid ducts 22, 23 and 32 on the one hand and the control ducts 44 and 44' on the other hand regular or defined points of intersection may be produced, which render possible the use of the valve means as a modular component in the form of a universal "insert". Furthermore by different connection up of the control chambers 43 and 43' with line, control and atmospheric pressure it is possible to ensure a simple attainment of different valve states without further modifications of the valve means.

In accordance with a convenient further development it is possible for the output volumetric to be varied in proportion to pressure in one of the two control chambers 43 and 43' so that together with a suitable actuator element an indirectly operating or regulating valve may be produced. Furthermore there is the possibility of producing amplification of pressure by having two additional diaphragms placed in the power plane and having a smaller area than the above mentioned actuating diaphragms simultaneously with the amplification of quantity or rate.

Last but not least it is to be noted that the tension state or the position of one or more diaphragms may be utilized to detect the setting quantity, this being more particularly possible in the case of use of the valve means as an amplifier.

What is claimed is:

1. A valve means comprising a housing which contains a movable switching element having two closure portions each associated with an opening of a fluid duct and engaged at two spaced points by two actuating diaphragms, which are able to be subject to fluid so that the switching element is able to be positioned in at least two switching positions in which the respectively one duct opening is closed and the respectively other duct opening is open, the switching element being constituted by a switching rocking member adapted to perform a pivotal movement on switching over, whose rocking arms placed on either side of a pivotal portion are engaged respectively by one of the actuating diaphragms and on which respectively one of the closure portions is provided, the two first and second fluid ducts associated with the closure portions and furthermore a third fluid duct communicating with a common connecting chamber, the third fluid duct being connected, dependent on the switching position of the switching rocker member, by way of the connecting chamber with the first or with the second fluid duct, the third fluid duct opening into the connecting chamber between the two other fluid ducts and in this respect opposite to the pivotal portion of the switching rocker member adjacent to a bottom longitudinal side of the switching rocker member and in that a pivotal bearing means for the switching rocker member is only located adjacent to a top longitudinal side of the switching rocker member.

2. The valve means as set forth in claim 1, wherein the switching rocker member and the actuating diaphragms are accommodated in a common interior space of the housing.

3. The valve means as set forth in claim 1, wherein the actuating diaphragms are each attached to the housing on the one hand and on the other hand to the switching rocker member.

4. The valve means as set forth in claim 1, wherein the two actuating diaphragms are arranged adjacent to each other perpendicularly to the height direction at least approximately at the same level.

5. The valve means as set forth in claim 1, wherein the two duct openings associated with the closure portions are arranged adjacent to each other perpendicularly to the height direction at least approximately at the same level.

6. The valve means as set forth in claim 1, wherein the two actuating diaphragms on the one hand and the two closure portions on the other hand are provided on mutually opposite longitudinal sides of the rocker member.

7. The valve means set forth in claim 1, wherein the switching rocker member, the actuating diaphragms and the closure portions are collected together in a common element.

8. The valve means as set forth in claim 1, wherein the two actuating diaphragms respectively constitute a fluid-tight moving wall between the connecting chamber and a control chamber, each control chamber being subject to a control pressure, the control pressures being able to be selected independently of one another.

9. The valve means as set forth in claim 8, wherein each control chamber communicates with a control duct, the outer duct openings provided on the outer side of the housing of the control ducts being arranged adjacent to each other perpendicularly to the height direction at least approximately at the same level.

10. The valve means as set forth in claim 1, wherein the two actuating diaphragms are made with different areas.

11. The valve means as set forth in claim 1, wherein the actuating diaphragms consist at least partially of rubber elastic material.

12. The valve means as set forth in claim 1, wherein the two actuating diaphragms are united as a common diaphragm element.

13. The valve means as set forth in claim 1, wherein the housing consists of a plurality of housing parts piled on each other as layers, the two actuating diaphragms being clamped between the same housing parts.

14. The valve means as set forth in claim 1, wherein the outer duct openings of the fluid ducts provided on the outer side of the housing are arranged adjacent to each other perpendicularly to the height direction at least approximately at the same level.

15. The valve means as set forth in claim 1, wherein the switching rocker member is biased by a spring means into one switching position.

* * * * *